(12) United States Patent
Mattern et al.

(10) Patent No.: US 9,922,377 B2
(45) Date of Patent: Mar. 20, 2018

(54) ELECTRONIC TIMEKEEPING SYSTEM AND METHOD OF USING SAME

(71) Applicant: Wiedza Creations LLC, Orlando, FL (US)

(72) Inventors: Sarah E. Mattern, Orlando, FL (US); James R. Haggard, Cocoa, FL (US)

(73) Assignee: Wiedza Creations LLC, Orlando, FL (US)

( * ) Notice: Subject to any disclaimer, the term of this patent is extended or adjusted under 35 U.S.C. 154(b) by 276 days.

(21) Appl. No.: 14/665,375

(22) Filed: Mar. 23, 2015

(65) Prior Publication Data

US 2016/0284030 A1    Sep. 29, 2016

(51) Int. Cl.
*G06Q 40/00* (2012.01)

(52) U.S. Cl.
CPC .................. *G06Q 40/125* (2013.12)

(58) Field of Classification Search
USPC .......................................................... 705/32
See application file for complete search history.

(56) References Cited

U.S. PATENT DOCUMENTS

| | | |
|---|---|---|
| 5,491,672 A | 2/1996 | Ferris |
| 5,557,553 A | 9/1996 | Sellie, Sr. |
| 5,696,702 A | 12/1997 | Skinner et al. |
| 5,852,797 A | 12/1998 | Bovay et al. |
| 5,909,672 A | 6/1999 | Madore et al. |
| 6,294,999 B1 * | 9/2001 | Yarin .................... A61J 7/0481 340/573.1 |
| 6,424,598 B1 | 7/2002 | Shultz |
| 6,791,452 B2 | 9/2004 | Fletcher et al. |
| 6,832,176 B2 | 12/2004 | Hartigan et al. |
| 7,072,793 B2 | 7/2006 | Lehman |
| 7,225,193 B2 | 5/2007 | Mets et al. |
| 7,266,048 B1 * | 9/2007 | King ....................... G07C 1/16 235/377 |
| 7,289,016 B2 | 10/2007 | Luebke et al. |
| 7,465,085 B2 | 12/2008 | McDonough |
| 7,489,595 B2 | 2/2009 | King et al. |
| 7,675,822 B2 | 3/2010 | Moritani |
| 7,710,830 B2 | 5/2010 | Mansmann et al. |
| 7,978,564 B2 | 7/2011 | De La Huerga |
| 8,229,810 B2 | 7/2012 | Butera et al. |
| 8,675,452 B2 | 3/2014 | Saunders et al. |
| 2003/0007421 A1 | 1/2003 | Niemiec et al. |

(Continued)

*Primary Examiner* — Florian M Zeender
(74) *Attorney, Agent, or Firm* — David M. Quinlan, P.C.

(57) ABSTRACT

An apparatus for tracking the time spent on different tasks on behalf of different entities comprises a plurality of tokens, each having an RFID coded with information uniquely associated with one of the tasks or one of the entities. A platform connected to a user's computer has an internal sensor that detects the RFID tag of a token placed on the top of the platform. Timing circuitry in the platform generates a start signal when the sensor detects a token's RFID tag and a stop signal when the token is removed from the platform. Decoding circuitry in the platform generates a data signal identifying the task or entity associated with the token. The user can then use his or her computer to associate the time spent on a task with a particular entity. Tokens include three-dimensional icons or text to identify the task or entity represented by each token, respectively.

19 Claims, 4 Drawing Sheets

(56) References Cited

U.S. PATENT DOCUMENTS

| | | |
|---|---|---|
| 2003/0069815 A1* | 4/2003 | Eisenberg .............. G06Q 10/10 705/32 |
| 2004/0006445 A1 | 1/2004 | Paek |
| 2004/0145114 A1 | 7/2004 | Ippolito et al. |
| 2004/0264300 A1 | 12/2004 | Gratkowski |
| 2006/0004540 A1 | 1/2006 | Hamilton et al. |
| 2006/0031484 A1 | 2/2006 | O'Neill |
| 2009/0150178 A1 | 6/2009 | Sutton et al. |
| 2012/0063272 A1 | 3/2012 | Dorais et al. |
| 2012/0109578 A1 | 5/2012 | Parulekar et al. |

* cited by examiner

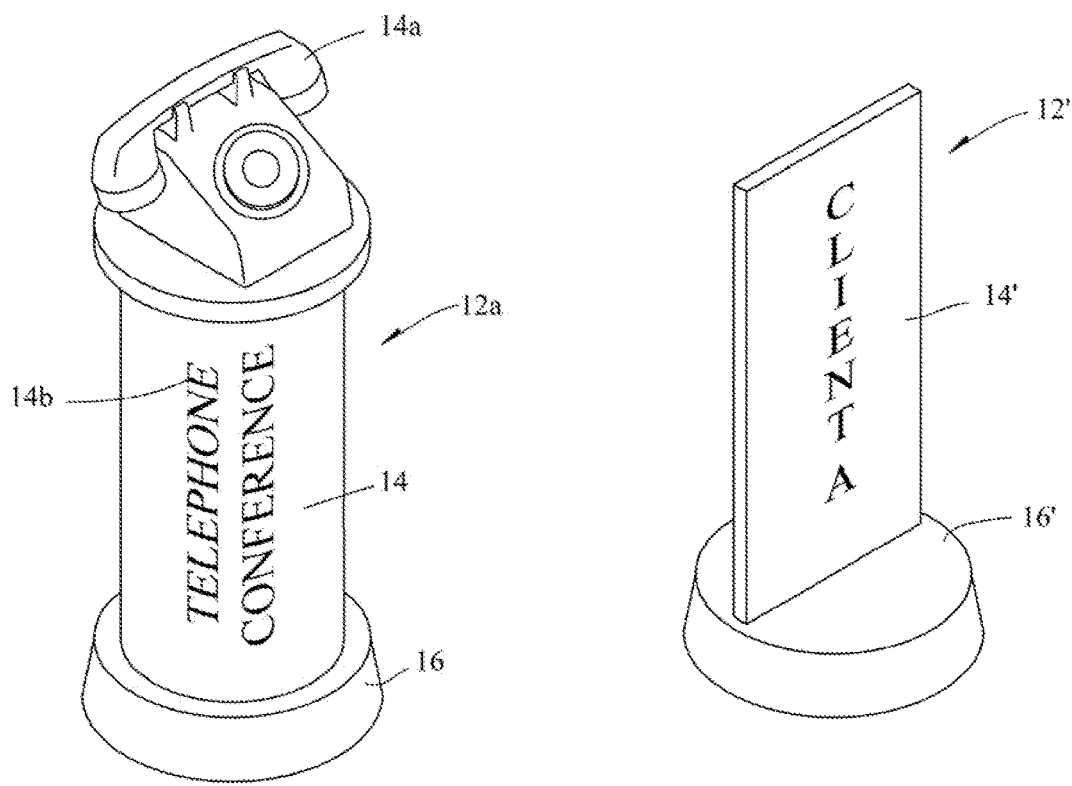
FIG. 2
FIG. 5
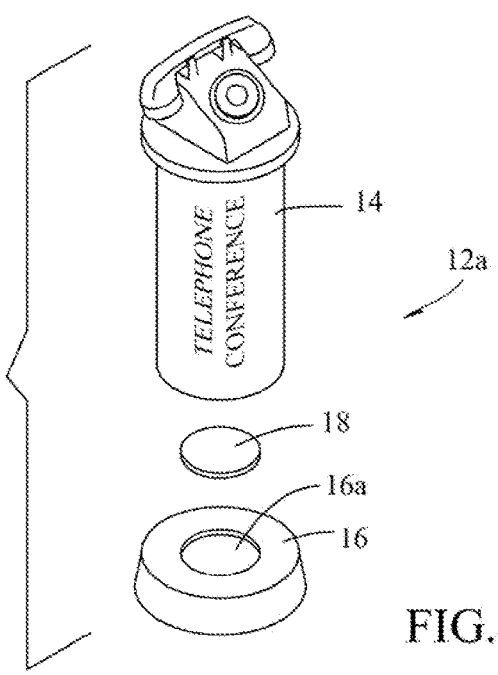
FIG. 2A

ELECTRONIC TIMEKEEPING SYSTEM AND METHOD OF USING SAME

BACKGROUND OF THE INVENTION

Field of the Invention

The present invention relates to correlating the time elapsed between the start and termination of multiple tasks and information associated with each task and/or with an entity for whom a task is performed, and more particularly, to a timekeeping system and method using a plurality of electronically readable tokens coded with information uniquely associated with predetermined tasks and/or entities and a sensing device for detecting a token and decoding the information.

Description of Related Art

Many commercial and professional endeavors use task-based billing to charge customers and clients based on the time spent working on a particular matter. This billing method is ubiquitous in the legal profession, whereby an attorney or paraprofessional will log the nature of the task and the time spent performing it. The client is then billed according to the hourly rate of the person who performed the task. All such task-based billing systems require logging information associated with the task, such as a description of the task (client meeting, a telephone call, legal research, etc.), the identity of the entity to be billed for the task, and the time spent performing the task.

Given the more or less mechanical nature of this type of billing-recording time spent and multiplying by a billing rate—it has been the subject of numerous attempts at computer implementation. One such commercially available system to that end is Timeslips® computer program that allows a user to track time spent on tasks for individual clients. One of the features of Timeslips® is a timer function whereby a user can manually activate and deactivate a timer icon on a data entry screen displayed by the program, with the elapsed time being associated with a task manually entered into a space provided on the same screen. This is cumbersome because the user has to keep Timeslips® always running on his computer, open a data entry screen, enter the client name and task information, click the icon to start the timer function, click the icon to stop the timer function when the task is complete (or interrupted), open another data entry screen for a task involving a different client, enter that client name and task information, click the icon to start the timer function for that task, click the icon to stop the timer function when that task is complete (or interrupted), and so on. There is also other prior art that describes various kinds of computerized systems designed to automate task-based billing in one way or another. Examples are disclosed in U.S. Pat. No. 5,909,672, U.S. Pat. No. 6,832,176, U.S. Pat. No. 8,229,810, and Pub. No. US2006/0031484. While these systems automate various functions with the goal of relieving the user from inputting all of the data necessary to effectuate task-based billing, none actually automates the process to an extent that significantly reduces the inconvenience of inputting sufficient information for calculating charges according to the time spent by particular individuals on tasks correlated with client matters.

Another prior art system that seeks to automate data entry for task-based billing is disclosed in Pub. No. US2003/0069815, which uses RFID ("radio frequency identification") tags physically attached to files. The RFID tag attached to a particular file can include the name or title of the file, a file number, client name, project name, etc. Users scan the file's RFID tag at their computer workstations which begins a timer. When the user scans the file again (or scans another file), the timer stops and the time spent on that file, along with the user's identity and information from the RFID tag, is recorded. This system is more automated than the others discussed above, but it also has drawbacks. For one thing, it requires actual files to be manually scanned twice, once to start the timing operation and again to stop it. It also fails to account for situations in which the attorney does not have a file at his or her workstation but needs to log time against that file. For example, an attorney may be billing time against a file at the workstation when he or she receives a telephone call from another client whose file is not in the attorney's possession.

SUMMARY OF THE INVENTION

It is an object of the present invention to provide a more convenient and user-friendly automated system for and method for correlating information relating to a task performed on behalf of a particular entity and the time spent performing same.

One aspect of the invention, broadly stated, is an apparatus for tracking the length of time spent on each of a plurality of different tasks on behalf of a plurality of different entities, which apparatus comprises a plurality of tokens, each including a remotely readable electronic tag coded with predetermined information uniquely associated either with one of tasks or one of the entities. The tokens are used with a sensing device that includes a sensor for detecting the electronic tag of a token when the token is at a predetermined position relative to the sensing device, timing circuitry for generating a start signal when the sensor first detects the electronic tag and a stop signal when the sensor ceases detecting the electronic tag, and decoding circuitry for generating a data signal with content based on the predetermined information (task or entity) identified by the detected electronic tag.

In one preferred form the predetermined information is associated with a task represented by visible indicia on the token for identifying the task to the user of the apparatus, and the electronic tag (which is typically an RFID tag) is disposed internally of the token and is invisible to the user. In a preferred form the tokens are columnar, about one to two inches high to permit easy handling by a user, and the visible indicia is a three-dimensional icon representing the task associated with the token molded on top of the column forming the token. In another preferred form, the predetermined information is associated with an entity and the visible indicia is written text or an image representing the entity associated with the token.

In another aspect of the invention, a system is provided for tracking the length of time spent by a user on each of a plurality of different tasks on behalf of a plurality of different entities. In one embodiment the system comprises a plurality of tokens and a sensing device as described above. The system further includes an application software module for interfacing with time and billing software to generate billing information based on the start signal, the stop signal, the data signal and a billing rate of the user. The application software module can be realized in a number of ways, including residing on a computer connected to the sensing device or on a cloud-based remote server.

Method aspects of the invention involve obtaining a plurality of tokens and a sensing device as described above. The steps of the method include placing a token on the surface of the sensing device, thereafter performing the task associated with the token, and removing the token from the surface of the sensing device after completing the task. The relative times of respective multiple start and stop signals generated by the timing circuitry from the electronic tags of tokens placed on and removed from the platform can be correlated with the task associated with the data signal generated by the sensing circuitry from the electronic tag of each token.

This Summary is provided solely to introduce in a simplified form a selection of concepts that are described in detail further below. It is not intended necessarily to identify key or essential features of the subject claimed herein, nor is it intended to be used an aid in determining the scope of the claimed subject matter.

BRIEF DESCRIPTION OF THE DRAWINGS

Objects of the invention will be better understood from the detailed description of its preferred embodiments which follows below, when taken in conjunction with the accompanying drawings, in which like numerals and letters refer to like features throughout.

The following is a brief identification of the drawing figures used in the accompanying detailed description.

FIG. 2 is an isometric view of one of the tokens depicted in FIG. 1, and FIG. 2A is an exploded isometric view illustrating parts of the token.

FIG. 5 is an isometric view of an exemplary token representing another embodiment of the invention.

Those skilled in the art will readily understand that the drawings omit details of various manners of implementing certain aspects of the invention, but nevertheless will find them sufficient, when taken with the detailed descriptions of preferred embodiments that follow, to make and use the present invention.

DETAILED DESCRIPTION OF PREFERRED EMBODIMENTS

It should be understood that the description herein is intended solely as exemplifying various forms the invention can take. Thus, it will be appreciated that the detailed description that follows is intended solely to provide specific examples of particular embodiments illustrating various ways of implementing the claimed subject matter, and that the invention is defined solely by the claims appended hereto, which are not limited to implementation or realization by any specific embodiment or example used to illustrate certain aspects of the invention. Moreover, the description herein is written to take into account the level of knowledge of one of ordinary skill in the art to which the claimed subject matter pertains. Accordingly, some specifics may be omitted as being unnecessary for enabling such a person to realize the embodiments described herein. It will also be understood that terms indicating direction or orientation, such as "top," "upper," "lower," etc., may be used throughout to facilitate the description. The use of such terms does not imply that the claimed subject matter is limited to a particular orientation of the item, structure, or feature being described.

I. Exemplary Embodiment of the Timekeeping System

Figure 1:
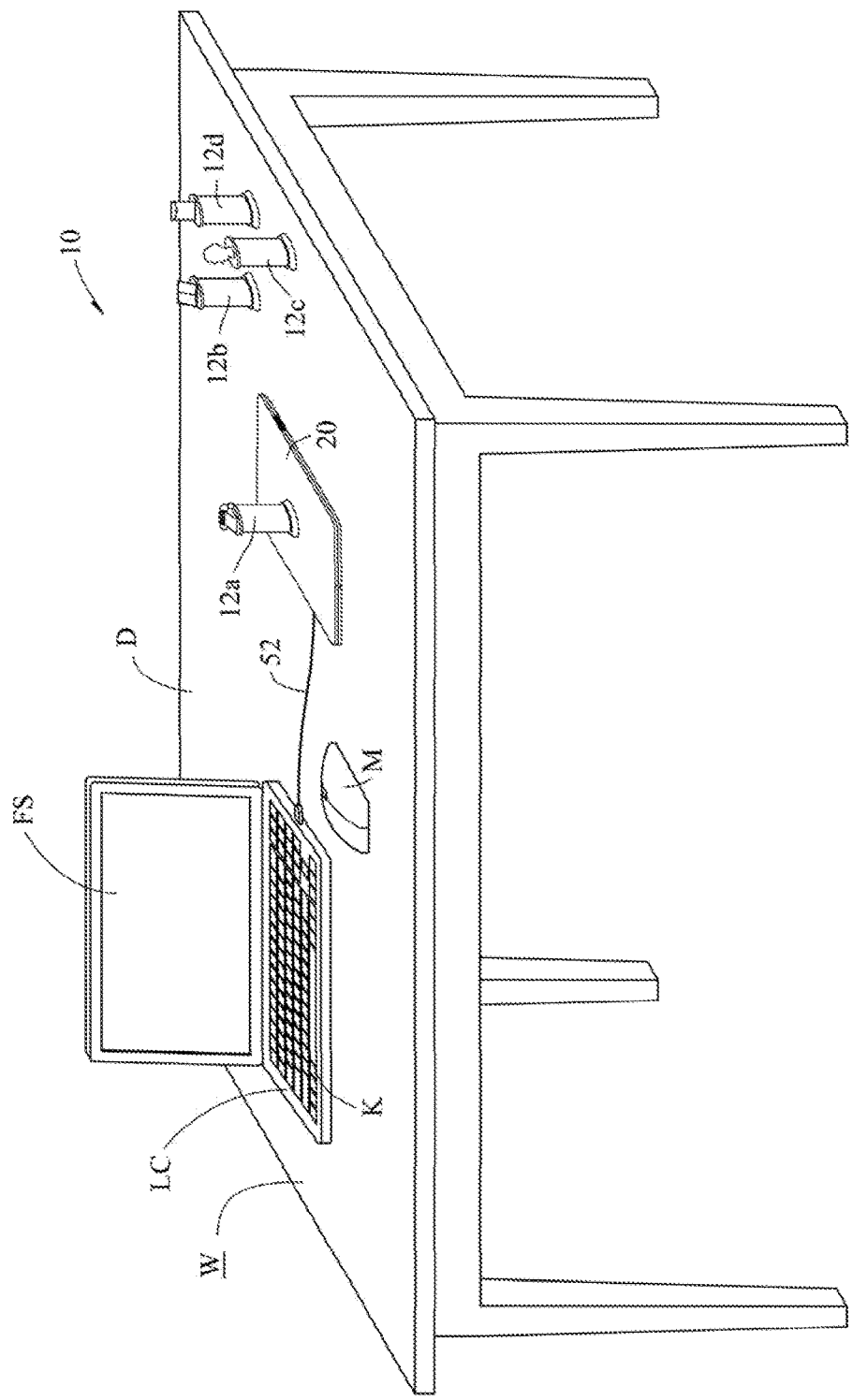
FIG. 1 illustrates a workstation with a system using a base station platform and tokens for tracking time in accordance with one embodiment of a timekeeping system according to the present invention.

FIG. 1 illustrates a workstation W for implementing a timekeeping system 10 according to one embodiment of the invention. The present embodiment is particularly adapted to a timekeeping system for attorneys, who generally bill clients according to how much attorney time is spent on discrete tasks. It will be appreciated that the system can be used to track the time spent on particular tasks other than those related to a legal practice, and the subject matter claimed herein is not necessarily limited to use by attorneys to keep track of their time. The workstation W according to the present embodiment includes a standard laptop computer LC with conventional internal circuitry and modules, such as a hard disc for storing files and executable programs under the control of an internal CPU (not shown), along with conventional input/output devices such as a flat screen monitor FS and a keyboard K that are integral parts of the laptop computer. The laptop computer may also have an integral pointing device for controlling a cursor or a separate mouse M for the same purpose. The laptop computer LC and the mouse M are arranged to a user's preference on the top of a table or desk D.

Those skilled in the art will recognize that the computer setup in FIG. 1 is meant to be exemplary of any computer system capable of interfacing with the timekeeping system in the manner described herein. To that end, the computer setup can be a desktop computer with peripheral input/output devices connected to a separate CPU unit, a tablet computer, a smartphone, or any other electronic computing device with suitable operating system and application software for executing program instructions. In addition, terms referring to elements of the system, and of the user interfaces described herein, are used for simplicity of reference. For example, discrete control areas displayed on an electronic device may be referred to as "windows," and it will be appreciated that this does not limit the claimed subject matter to using any particular operating system, whether it is a version of a Windows® operating system module or a version other operating systems using software of other providers or users. Moreover, as used in this description, the terms "component," "module," "system," "apparatus," "interface." or the like are generally intended to refer to a computer-related entity, either hardware, a combination of hardware and software, software, or software in execution, unless the context clearly indicates otherwise. For example, such a component may be, but is not limited to being, a process running on a processor, a processor, an object, an executable, a thread of execution, a program, and/or a computer. By way of illustration, both an application running on an electronic computing device and the device itself can be a component. One or more components may reside within a process and/or thread of execution and a component may be localized on one computer and/or distributed between two or more computers.

FIG. 1 further depicts elements of the timekeeping system 10 in accordance with the present embodiment of the invention. One principal aspect of the system comprises a plurality of tokens 12a, 12b, 12c, and 12d. Further details of the tokens are described below in connection with FIGS. 2 and 2A, but for present purposes it is sufficient to understand that the tokens include three-dimensional icons representing typical tasks performed by attorneys for which they bill their clients. For example, the token 12a includes a model of a telephone to represent the attorney task of conducting a telephone call with or on behalf of a client. The token 12*b* includes a model of a book, to represent the task of conducting legal research; the token 12*c* includes a model of a person's head, representing a personal meeting; and the token 12*d* includes a model of an envelope, representing preparation of correspondence (for example, a letter or email). This is just a sample of representative tasks that can be associated with individual tokens. A non-exhaustive list of other such tasks could include document preparation, document review, attorney training, preparing for and/or conducting depositions, just to name a few.

FIG. 2 is an exploded isometric schematic depiction of the token 12*a*. It generally comprises a circularly cylindrical column 14 about one to two inches high, molded in one piece from a suitable plastic material. The column is molded with the three-dimensional icon 14*a* in the shape of a small model of a telephone on the top of the column, and with text 14*b* imprinted on its side to confirm to a user the task represented by the icon. It will be appreciated that other ways of representing the task associated with a given token can be used without departing from the spirit of the invention, such as having only text or using a two-dimensional image of an object to represent a particular task. The token also includes a base 16 with a circular recess 16*a*. The base is typically molded in one piece from the same plastic material as the column to facilitate manufacturing. The recess 16*a* is sized to accept an electronic tag 18, in this case a disc-shaped conventional radio frequency identification (RFID) transmitter. Other shapes of RFID tags can be used, or a near field communication (NFC) chip can be used instead of an RFID tag. In any case, the column and base are permanently bonded together with the electronic tag securely captured in the recess 16*a*. It is contemplated that in a typical implementation the RFID tag will not be removable and that the tokens will be manufactured to make it more economical to replace the entire token if the electronic tag malfunctions over time. The electronic tag 18 is coded to uniquely identify the task (in this case a telephone conference) associated with the token in which it is embedded. The specific material used to fabricate the tokens is generally a matter of choice, but it must be transparent to electromagnetic radiation to be remotely read by the sensing device described in the next paragraph.

Figure 3:
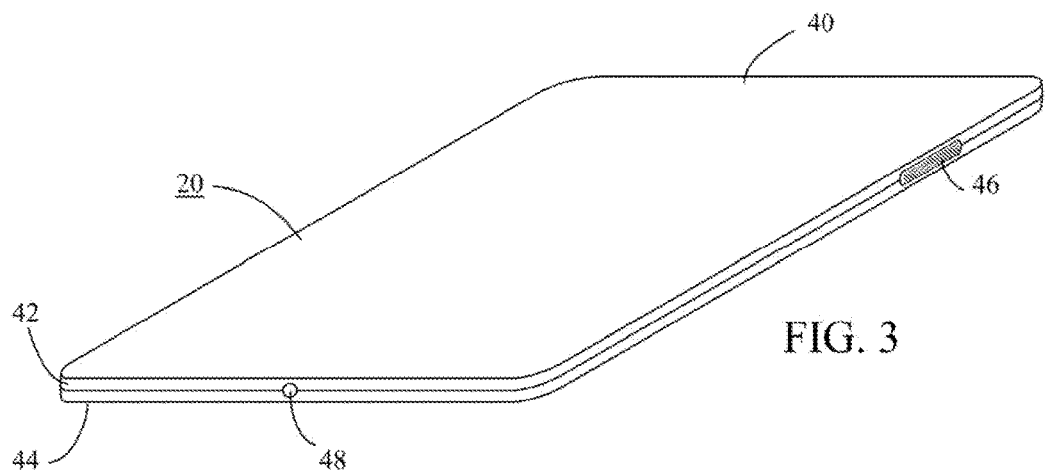
FIG. 3 is a schematic isometric view of the base station platform shown in FIG. 1.
Figure 4:
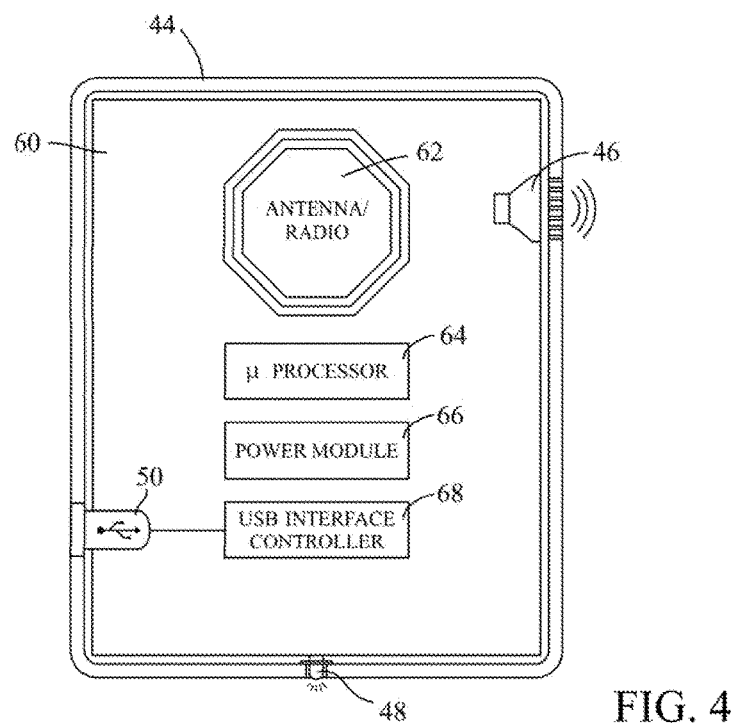
FIG. 4 is a top view of the schematic base station platform shown in FIG. 2 with the top of the housing removed to show internal components of the platform.

FIGS. 3 and 4 schematically depict a sensing device 20 that is a second principal aspect of the timekeeping system 10. In the present embodiment the sensing device is in the form of a thin rectangular platform 40 between three and four inches on a side and as thin as possible, preferably about inch thick. The platform is conveniently constructed of an upper casing 42 and a lower casing 44 molded from a suitable plastic material, preferably the same material used for the tokens, since the platform must also be transparent to electromagnetic radiation because it has an internal sensor (described in more detail below) for detecting the electronic tags 18 in the tokens 12. The platform 40 includes a speaker 46 and an LED 48 for purposes described further below. It further comprises a communication device, such as a USB port 50 for communicating with the CPU unit of the computer setup via a cable 52 as depicted in FIG. 1. Those skilled in the art will appreciate that the scope of the invention encompasses any manner of communicating with the CPU, such as via wireless connections like Bluetooth, a suitable radio frequency serial link, or via a wireless network (WiFi).

Internal electronic components of the platform 40 are represented schematically in FIG. 4, which is a top view of the platform with the top half 42 removed. It will be appreciated that even though the depiction in FIG. 4 is highly schematic, it will be sufficient for one skilled in the art to construct the platform for use as described herein. It is contemplated that most of the electronic components of the sensing device 20 will be mounted on and electrically connected by a printed circuit board 60 sized to fit within the dimensions of the housing 40 via mechanical connection to the housing lower half 44. One salient component of the sensing device is an antenna/radio 62 for communicating with the electronic tags 18 embedded in the tokens 12. The antenna function of this component reads the electronic tag's coded information associated with the token resting on the platform 40 (as seen in FIG. 1, showing the token 12*a* in place on top of the platform). The radio function of this component sends signals to the token to power the electronic tag. It will be appreciated that an alternate arrangement can use an electronic tag self-powered by a battery in the token.

Another important component of the sensing device is a microprocessor 64, which can be embodied in software and firmware for carrying out the various functions described herein either automatically upon the receipt of signals from components within the sensing device or from software resident on the computer set up shown in FIG. 1. One of the functions of the microprocessor 64 is to generate a start signal when the antenna 62 senses the presence of a token 12 and a stop signal when the antenna ceases to sense the presence of that token. The microprocessor 64 also includes decoding circuitry for reading the coded information transmitted by the electronic tag to identify the task with which the token is associated. A power module 66 handles the power requirements of the sensing device. For example, the power module, under the control of the microprocessor 64, provides the power necessary to enable the radio to power the electronic tag. A USB interface controller 68 connects to the USB port 50 and includes circuitry that enables communication between the sensing device and the CPU unit of the computer LC shown in FIG. 1. This can include providing the necessary power to the sensing device.

Other components of the platform 40, while not strictly necessary for performing a timekeeping function, nevertheless make the operation of the timekeeping system of the present invention more convenient for the user. One such component is the speaker 46, which provides a chirping sound at predetermined time intervals when the sensing device continuously senses the presence of a particular token. This can be accomplished by a timer module on board the microprocessor 64 or by software resident on the laptop computer LC. This chirp (or other suitable sound) alerts a user who may have forgotten to remove the token when he or she completed the task for which the token was placed on the platform. For example, the user may have placed the token 12*b* on the platform 40 when beginning a legal research project and then later completed the project but forgot to remove the token from the platform. The predetermined time interval can be set to any desired value, but in one embodiment it will be 30 minutes. It is believed that period is long enough that the chirp will not be a distraction to the user, but will not be too long to prevent the user from recalling at least an approximate time when work on the project was actually stopped. It will be appreciated that the speaker can be a simple piezoelectric oscillator that emits only one sound, so as not to unduly increase the cost of manufacturing the platform. The LED 48 constitutes another convenience feature by providing visual confirmation that the platform is powered on and operable to sense the presence of tokens placed on the platform 40.

II. Implementation and Use of the Timekeeping System

Typically, a timekeeping system and apparatus as described and claimed herein will typically be made compatible with third-party commercially available time-tracking and billing software such as Timeslips®. The system can be conveniently provided as a kit including the platform 40, a selection of tokens 12, and an application software module to enable interfacing with the time and billing software on the user's computer LC. This software can be provided on a storage medium such as DVD disc that the user installs on her computer, or via downloading from a server at a website made accessible as part of the purchase of a kit including the platforms and tokens. Another exemplary implementation would employ a cloud-based system in which the data generated by the present timekeeping system is communicated directly to time-tracking and billing software implemented via one or more remote servers.

In operation, the user places the appropriate token on the platform upon beginning a particular task. For example, when the user begins a legal research project, she places the token 12b on the platform 40. The antenna in the platform senses the presence of the token (via detection of the electronic tag 18), and in response a timing circuitry module of the microprocessor 64 generates a start signal. At the same time, the antenna detects the information encoded in the token's electronic tag 18 representing the task with which the token is associated (legal research) and the microprocessor's decoding circuitry generates a data signal that has content based on that task. When the task is completed the user removes the token from the platform, whereby the antenna ceases to sense the electronic tag embedded in the token, which causes the microprocessor's timing circuitry module to generate a stop signal.

These signals can be processed in a variety of ways to implement the timekeeping function accomplished by the invention. For example, in one implementation, the microprocessor 64 timing circuitry can generate an elapsed time signal that represents the time between the start and stop signals, and the decoding circuitry can include a software module that generates a code recognized by the associated application software resident on the laptop computer as indicative of the particular task associated with the token in question. Alternatively, the start signal, data signal, and stop signal can be directly communicated via the USB connection to the application software, which in this case would include compilation circuitry that generates an elapsed time and a text representation of the task for display to the user at the user's request.

It will be appreciated that the microprocessor generates the start, stop, and data signals each time a token is placed on the platform 40 and then subsequently removed therefrom. Thus, if the user is in the middle of a legal research project and receives a telephone call, she removes the token 12b from the platform and replaces it with the token 12a. The start and stop times of the legal research project are logged as discussed above and associated with the task of legal research (token 12b). When the user places the token 12a on the platform 40, a start signal is generated for that task, along with a data signal identifying the task (telephone conference). When the telephone conference is complete, the token 12a is removed from the platform and a stop signal is generated and an elapsed time for the telephone conference is logged. If the user resumes the legal research project, the token 12b is placed back on the platform 40. The user proceeds in this fashion until she desires to enter the time for each task into the billing program she uses for time-based billing.

In one implementation, the application software module on the laptop computer LC will have a summarize command that generates a table associating the various tasks performed by the attorney during a particular time period. The summarize command will generate a table for display on the computer LC in a window correlating a list of the tasks performed by the attorney and the time spent on each, the following being an example of the form such a table could take.

TABLE 1

| TASK | START TIME | STOP TIME | CLIENT |
| --- | --- | --- | --- |
| Legal research | 9:34 am | 10:47 am | |
| Telephone conference | 10:47 am | 11:16 am | |
| Legal research | 11:16 am | 2:06 pm | |
| Client meeting | 2:43 pm | 3:58 pm | |
| Legal research | 4:16 pm | 6:22 pm | |

The user will then fill in the last column with the client with which each task was associated. In this regard, it has been found that most people are able to recall at a later time for whom a task was performed more readily than the amount of time spent on a task performed. The present embodiment takes advantage of that tendency by accurately recording the time spent on tasks for a given time period (say one day, as in the example represented by Table 1), and relying on the user's memory to associate the tasks with individual clients.

It will be appreciated that the above description is by way of an example of one manner of implementing the present system. Basing the system on the use of tokens as described herein inherently provides flexibility that enables implementation in a variety of ways by permitting vendors to offer various implementation options to users according to user preference. For example, a user can be given the option of configuring the application software module to communicate start, stop, and data signals to third-party time-tracking software after the generation of a start signal and subsequent generation of a stop signal, or after each start signal and each stop signal. If third-party time-tracking and billing software is resident on the laptop computer LC, the start, stop, and data signals would be provided to the software by inserting it into the database used by the software. Typically, the start, stop, and data signals would be provided to the third-party software by an Application Programming Interface (API) provided by the third-party vendor. Alternatively, the application software module of the present system could upload a formatted data file for use by a cloud-based time-tracking and billing program.

III. Alternate Token Implementations

FIG. 5 illustrates another token design for implementing a timekeeping system and method according to the description herein. In this embodiment, the token 12' has an electronic tag (not shown) coded to identify a particular client, rather than a task. The token 12' includes a tablet portion 14' that identifies the client with whom the electronic tag is associated and a base 16' for mounting the tablet portion. The token 12' is generally the same size as the token 12. The timekeeping system operates as described above, except that the first column of Table 1 above will list the clients for whom tasks were performed, leaving it to the user to fill in the tasks associated with each time period in the last column.

Still another embodiment uses tokens that can be coded and re-coded by the user with information representing information according to user preference. For example, an attorney can encode the tag in a particular token to represent, say, "legal research for XYZ Corp." Such a token could assume the shape of the token 12', but having a blank, erasable tablet portion which the user can write the information represented by the tag. This implementation could be adapted for use by a junior level associate attorney who primarily performs discrete projects under the supervision of senior attorneys. Each time the junior level attorney undertook a legal research project he or she could program or reprogram a token to reflect the nature of the assigned task (legal research, answering interrogatories, etc.) and the client on whose behalf it is being conducted. The associate attorney would use the token with the platform as discussed above and the start, stop, and data signals would be utilized with time-tracking and billing software in accordance with the above discussion.

IV. Alternate Workstation Configuration

Figure 6:
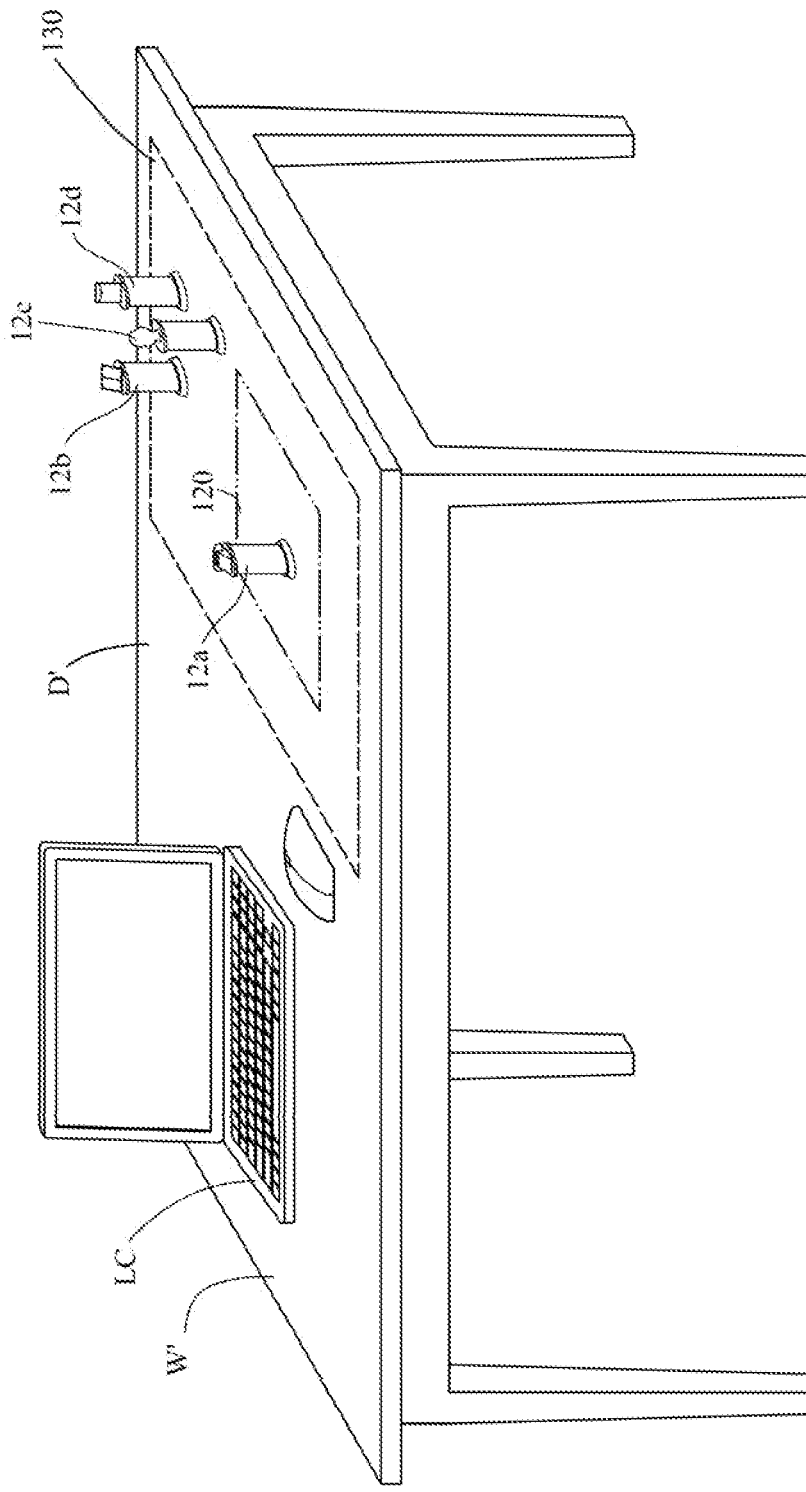
FIG. 6 is an isometric view illustrating a timekeeping system in accordance with an embodiment of the invention using an alternate workstation configuration.

FIG. 6 illustrates an alternate workstation W' using a different sensing device 120 in place on the platform 40 in the embodiment described above in connection with FIGS. 1, 3, and 4. FIG. 6 uses like numerals to denote like parts described above in connection with the first embodiment depicted in FIGS. 1 to 4. Elements of the FIG. 6 alternate embodiment are denoted by reference numerals in the 100's. In that connection, the sensing device 120 is made up of individual antenna/radio elements comparable to the module 62 in the platform 40 as shown in FIG. 4. These individual elements are under the top of the table or desk D' and are distributed over an area 130 indicated by dashed lines in FIG. 6.

In this embodiment, the application software module accompanying the timekeeping system would include a program module for activating a desired area denoted by dot-dash phantom lines in FIG. 6. The activated area comprises the sensing device 120, which operates in a fashion analogous to the platform 40 in the embodiment described above. This embodiment would enable a user to construct a sensing device with an active area that is convenient in size and position for the individual user. The application software could also enable the user to designate multiple active areas (sensing devices 120) each of which can read individual tokens. For example, a user could place one token in a first designated sensing area indicating a particular task, and another token in a second designated sensing area indicative of the client on whose behalf the task is being performed. In one implementation of this embodiment task tokens could identify predetermined tasks to simplify billing procedures, while client tokens would be programmable to enable the creation of tokens for identifying new clients.

V. Summary and Conclusions

As already noted, the present invention, while being described in connection with embodiments particularly adapted for use with the legal profession, it is not so limited. It is equally adaptable for use in other areas of endeavor. For example, teachers of activities, such as art, music, physical education, etc., in lower school grades could have a token for each class to track the amount of time a particular class spends "on task." Compiling this information across several classes would permit different classes' behavior to be compared to one another. Another embodiment could be used in a medical office to track the amount of time personnel (physicians, nurses, or non-profession staff) spend on particular tasks. In this implementation, tokens could represent different tasks, such as patient examination, billing activities, etc.

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. An apparatus for tracking the length of time spent by a user of the apparatus on each of a plurality of different tasks on behalf of a plurality of different entities, the apparatus comprising:
    a plurality of tokens, each including a remotely readable electronic tag coded with predetermined information uniquely associated with at least one of (i) a task, and (ii) an entity;
    a sensing device including an antenna for detecting the presence of the electronic tag of a token only when the token is within a predetermined distance relative to the antenna, wherein the antenna is configured for cooperating with timing circuitry for measuring the duration of a start signal initiated when the antenna first detects the presence of the electronic tag and terminated by a stop signal generated only when the antenna ceases detecting the electronic tag, and with decoding circuitry for generating a data signal with content based on the predetermined information identified by the detected electronic tag for association with the duration of the start signal; and
    a platform mounting the antenna and having an essentially flat surface on which the tokens can be removably placed by the user, wherein the antenna detects the presence of the electronic tag when one of the tokens is on the flat surface within the predetermined distance from the antenna.

2. An apparatus as in claim 1, wherein the platform comprises an enclosed a space housing the antenna, the timing circuitry, and the decoding circuitry.

3. An apparatus as in claim 2, wherein:
    the predetermined information is associated with a task represented by visible indicia on the token that represents the task to a human observer; and
    the electronic tag is disposed internally of the token and is invisible to the user.

4. An apparatus as in claim 3, wherein the visible indicia is a three-dimensional icon representing to a human observer the task associated with the token.

5. An apparatus as in claim 3, wherein the task is at least one of a telephone conference, legal research, a personal meeting, and preparing correspondence.

6. An apparatus as in claim 2, wherein:
    the predetermined information is associated with an entity represented by visible indicia on the token that represents the entity to a human observer; and
    the electronic tag is disposed internally of the token and is invisible to the user.

7. An apparatus as in claim 6, wherein the visible indicia is at least one of written text and an image representing the entity associated with the token to the human observer.

8. An apparatus as in claim 1 for installation as part of a desk with a desk top providing a workspace for the user, wherein:
    the platform comprises the desk top with a plurality of the sensors embedded therein; and
    the antennas are distributed in an area of the desk top and are invisible to the user of the apparatus, the apparatus being programmable using an electronic computing device to designate an active region in which the sensors can detect the electronic tag of a token when the token is placed on the desktop at a predetermined position relative to the active region.

9. An apparatus as in claim 1, Wherein the platform comprises an enclosed space housing the antenna and a connection device for communicating outputs of the antenna to timing circuitry and decoding circuitry resident on an electronic computing device separate from the platform.

10. A system as in claim 9, wherein the connection device is at least one of a USB port, a WiFi connection, and a Bluetooth connection.

11. An apparatus as in claim 1, wherein the platform includes a speaker for generating a sound when the duration of the start signal exceeds a predetermined elapsed time.

12. A system for tracking the length of time spent by a user of the system on each of a plurality of different tasks on behalf of a plurality of different entities, the system comprising:
 a plurality of tokens, each including a remotely readable electronic tag coded with predetermined information uniquely associated with at least one of (i) a task, and (ii) an entity;
 a sensing device including an antenna for detecting the presence of the electronic tag of a token only when the token is within a predetermined distance relative to the antenna, wherein the antenna cooperates with timing circuitry for measuring the duration of a start signal initiated when the antenna first detects the presence of the electronic tag and terminated by a stop signal generated only when the antenna ceases detecting the electronic tag, and with decoding circuitry for generating a data signal with content based on the predetermined information identified by the detected electronic tag for association with the duration of the start signal;
 a platform mounting the antenna and having an essentially flat surface on which the tokens can be removably placed by the user, wherein the antenna detects the presence of the electronic tag when one of the tokens is on the flat surface within the predetermined distance from the antenna; and
 an application software module for interfacing with time and billing software to generate billing information based on the start signal, the stop signal, the data signal and a billing rate of the user.

13. A system as in claim 12, wherein the platform comprises an enclosed space housing the antenna, the timing circuitry, and the decoding circuitry.

14. A system as in claim 13, wherein:
 the predetermined information is associated with a task represented by visible indicia on the token that represents the task to a human observer; and
 the electronic tag is disposed internally of the token and is invisible to the user.

15. A system as in claim 13, wherein:
 the predetermined information is associated with an entity represented by visible indicia on the token for identifying the entity to a human observer; and
 the electronic tag is disposed internally of the token and is invisible to the user.

16. A system as in claim 13, Wherein the application software module is resident on one of (i) an electronic computing device operatively connected to the platform, and (ii) a cloud-based remote server.

17. A system as in claim 12, wherein:
 the application software module is separate from the platform and the timing circuitry and decoding circuitry are resident on the application software module; and
 the platform comprises an enclosed space housing the antenna and a connection device for communicating an output of the antenna to the application software module.

18. A system as in claim 17, wherein the connection device is at least one of a USB port, a WiFi connection, and a Bluetooth connection.

19. A system as in claim 17, wherein the application software module is resident on one of (i) an electronic computing device, and (ii) a cloud-based remote server.

* * * * *

UNITED STATES PATENT AND TRADEMARK OFFICE
CERTIFICATE OF CORRECTION

PATENT NO. : 9,922,377 B2
APPLICATION NO. : 14/665375
DATED : March 20, 2018
INVENTOR(S) : Sarah E. Mattern et al.

It is certified that error appears in the above-identified patent and that said Letters Patent is hereby corrected as shown below:

Column 10, Line 35, Claim 2 should read --comprises an enclosed space housing the antenna, the--.

Column 11, Line 3, Claim 9 "Wherein" should read --wherein--.

Column 12, Line 20, Claim 16 "Wherein" should read --wherein--.

Signed and Sealed this
Twelfth Day of June, 2018

Andrei Iancu
*Director of the United States Patent and Trademark Office*